May 19, 1953
C. L. HAZELTON
2,638,688
FILTER TESTING DEVICE
Filed Sept. 23, 1948
2 Sheets-Sheet 1
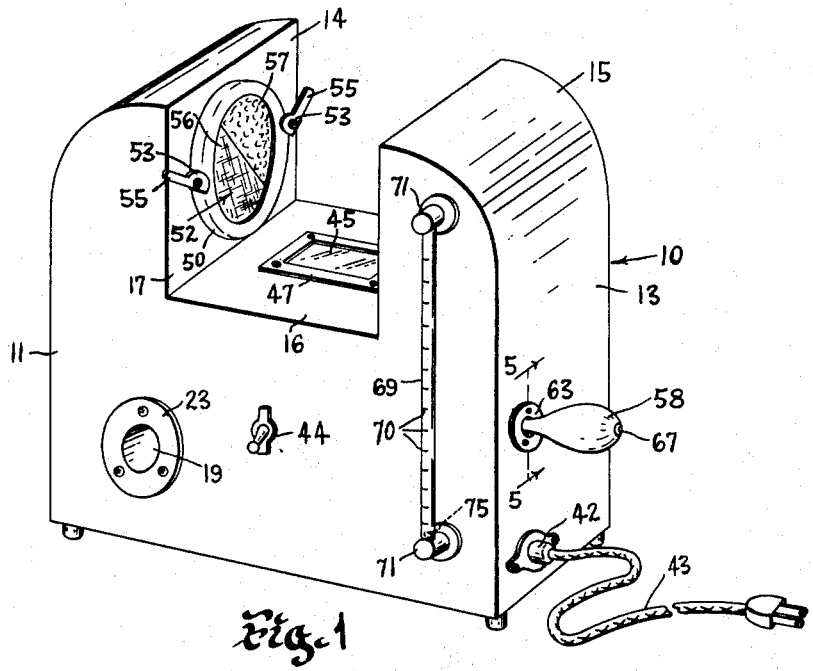
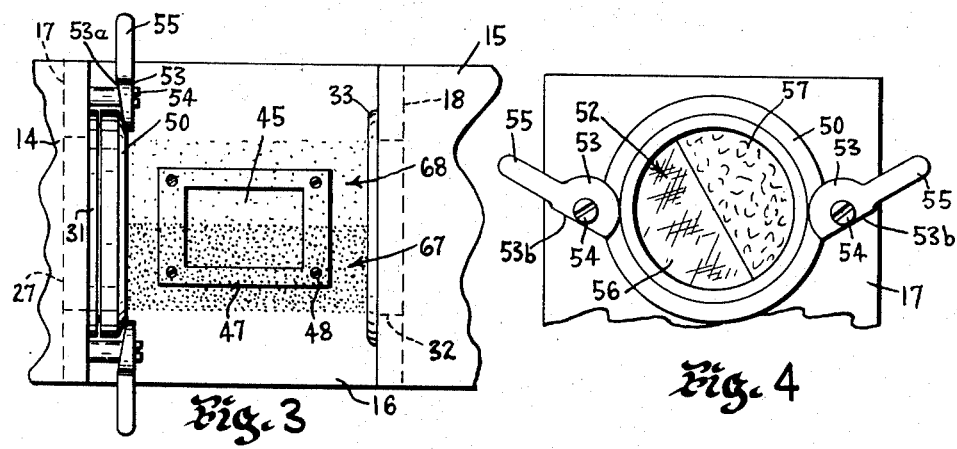
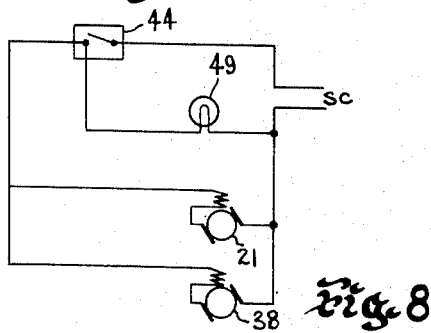
*INVENTOR.*
CHARLES L. HAZELTON
BY
*Louis L. Vagnon*
ATTORNEY May 19, 1953  C. L. HAZELTON  2,638,688
FILTER TESTING DEVICE
Filed Sept. 23, 1948  2 Sheets-Sheet 2
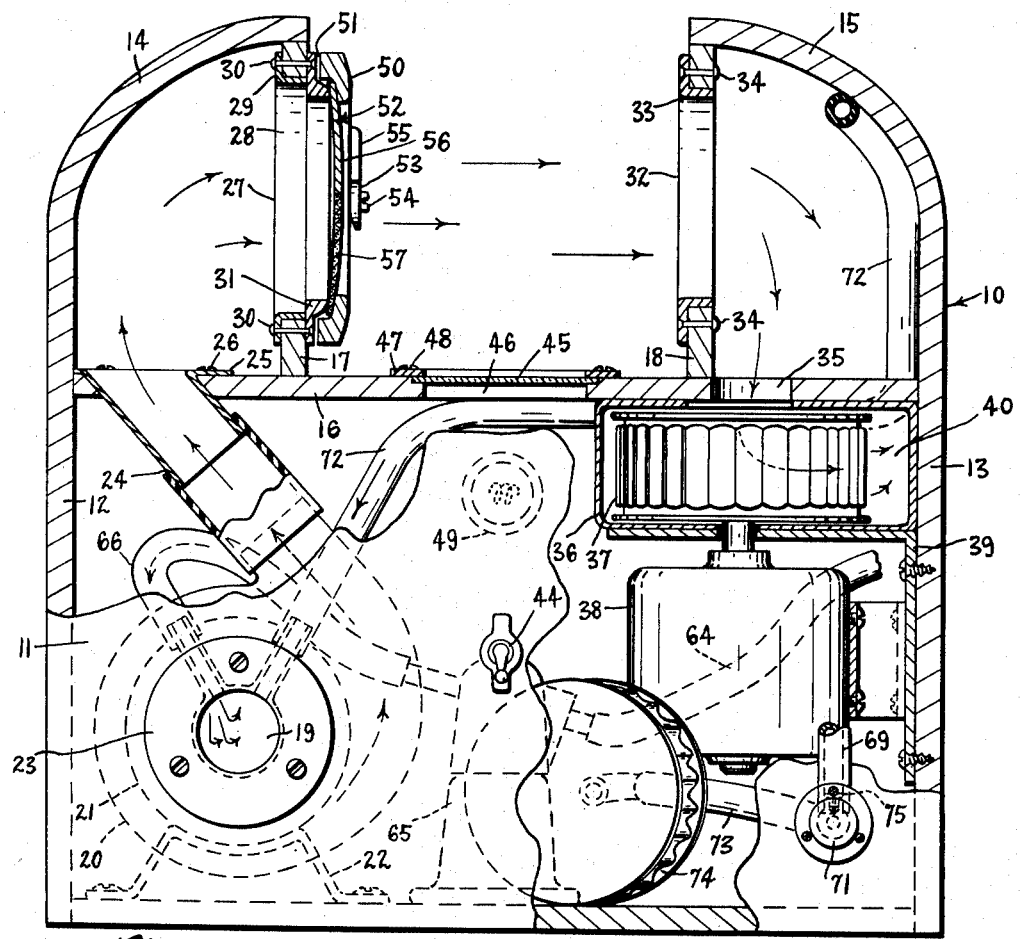
Fig. 2
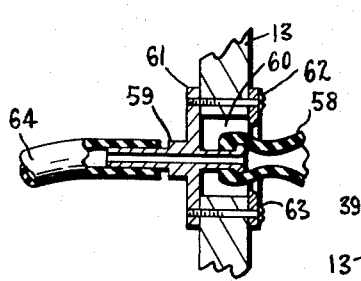
Fig. 5
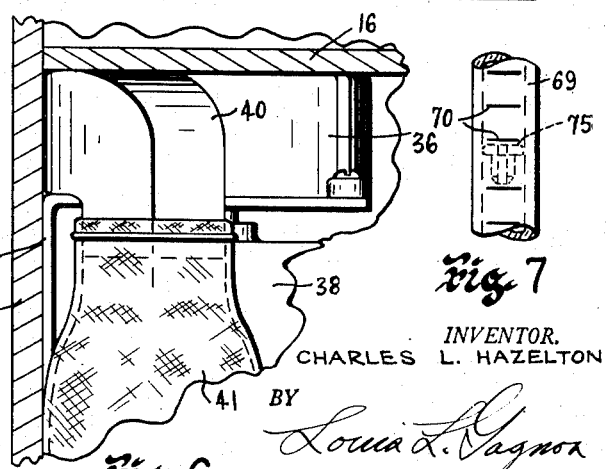
Fig. 6
Fig. 7
INVENTOR.
CHARLES L. HAZELTON
BY
Louis L. Gagnon
ATTORNEY Patented May 19, 1953

2,638,688

UNITED STATES PATENT OFFICE 2,638,688

FILTER TESTING DEVICE

Charles L. Hazelton, North Woodstock, Conn., assignor to American Optical Company, Southbridge, Mass., a voluntary association of Massachusetts Application September 23, 1948, Serial No. 50,839

9 Claims. (Cl. 35—13)

This invention relates to testing devices and particularly to devices for demonstrating and testing the porosity or filtering efficiency of fabrics or similar foraminous materials used as filter media.

The principal object of this invention is the provision of a combined filter efficiency demonstrating and resistance testing device for ascertaining the filtering characteristics of various filter media.

Another object is to provide a device for demonstrating the filtering efficiency of different filter media by visual comparison of the filter media while said filter media are being demonstrated.

Another object is the provision of a novel device for testing the resistance of various filter media as to the flow of air therethrough.

The invention also consists of certain new and original features of construction and combination of parts hereinafter set forth and claimed. Although the novel features which are believed to be characteristic of this invention will be particularly pointed out in the claims appended hereto the invention itself, as to its objects and advantages, the mode of its operation and the manner of its organization may be better understood by referring to the following description taken in connection with the accompanying drawing forming a part thereof, in which:

Fig. 1 is a perspective view of a preferred embodiment of the invention;

Fig. 2 is a front elevation partly in section of the invention of the embodiment disclosed in Fig. 1;

Fig. 3 is a fragmentary plan view of the device shown in Fig. 1;

Fig. 4 is a front elevation of the means for locating filter media in position for testing;

Fig. 5 is a fragmentary sectional view taken on line 5—5 of Fig. 1;

Fig. 6 is a fragmentary sectional view of the means for preventing dust or similar matter from circulating in the interior of the device;

Fig. 7 is a fragmentary front elevation view of a portion of the resistance indicating device; and Fig. 8 is a schematic diagram of the electrical circuit.

It is very important that filter media such as used in respirators for filtering dust, fumes, smokes and the like have efficiency characteristics above certain specified limits as to its filtering ability while affording maximum ease of respiration and, therefore, materials such as the felt, paper or other material used as filter media in cartridges of respirators of this type may be impregnated or otherwise treated to meet the various requirements set up for respirators used for different purposes. The present invention demonstrates the efficiency of filter media by visual comparison of various different types thereof or by comparing treated and untreated pieces of the same material to illustrate the comparative filtering characteristics and to indicate, for example, how certain treated materials may have better or poorer filtering characteristics than untreated materials, or by comparing different grades of treated or untreated materials to illustrate the respective filtering properties thereof.

Also combined with the demonstrating device is means for further testing said materials as to their resistance to air flow therethrough, with the said means embodying an indicating device which registers said resistance.

With particular reference to the illustrated embodiment of the invention, there is shown the housing for the present device generally indicated by reference numeral 10 which consists of a structure having front and rear walls 11 and left and right end walls 12 and 13 respectively. The housing 10 contains the operative parts of the device, and carries spaced uprights 14 and 15 on its top 16, the uprights having opposed inner walls 17 and 18.

Located in the housing 10 adjacent an opening 19 in the front wall 11 is a blower 20 operated by a suitable motor 21, the motor 21 being located on the floor of the housing 10 by means such as bracket 22. The opening 19 has mounted therearound an escutcheon plate 23 and is adapted to communicate directly with the blower 20 by means of a short conduit. The blower 20 is operatively mounted within a housing 10 in such a manner that air currents entering through the opening 19 will be drawn by the suction action of the blower 20 to the intake of the blower and then propelled by the blower through a conduit 24, as indicated by arrows in Fig. 2, into the upright 14 through an opening in the housing top 16 through which the conduit 24 communicates with the upright 14, the conduit 24 being suitably secured to the top 16 by means such as a flange 25 and screws 26.

The inner wall 17 of the upright 14 has provided therein an opening 27 in which is located a sleeve 28, the sleeve having a flanged portion 29 formed therearound through which members such as rivets, studs, or screws 30 are adapted to extend for attaching the sleeve 28 to the wall 17. A ring member 31 is located around the outer edge of the opening and is also adapted to be secured to the wall 17 by the members 30. Thus, air currents may proceed from the blower 20 through conduit 24 and upright 14, opening 27, sleeve 28 and ring member 31 to the space between uprights 14 and 15.

The inner wall 18 of upright 15 is provided with an opening 32 which is concentric with the opening 27 in the wall 17 of the upright 14 and which has a suitable flanged escutcheon plate 33 provided therearound and attached to the wall 18 by screws or rivets 34. This opening 32 communicates directly with the interior of the upright 15. The top 16 of the housing 10 is provided with an opening 35 to provide communication between the upright 15 and a blower housing 36 suitably surrounding blower 37 located within the housing 10, the blower 37 being similar to blower 20 and being operated by a motor 38, the motor 38 and blower 37 being supported upon the side wall 13 of the housing 10 by a bracket 39. The air current from the space between the uprights 14 and 15 enters the upright 15 through opening 32, and after passing through the interior of upright 15 by the suction action of the blower 37 enters the intake of the blower 37 through opening 35 and is propelled outwardly by the blower 37 through a conduit 40 (Fig. 6) into a bag 41 or similar means suitably provided for gathering particles of material which may be deposited in the air stream.

Located on the housing end wall 13 is a plug or other suitable type of electrical connection 42 to which may be connected the necessary wiring 43 leading to a suitable source of electrical current SC (Fig. 8). The motors 21 and 38 are circuitously connected to one side of a suitable manually operable switch 44 located in the front wall 11 of the housing 10, the opposite side of the switch being connected directly to the source of current SC. Thus operation of switch 44 will cause motors 21 and 38 to be simultaneously energized or de-energized depending upon whether the switch is actuated to close or open the circuit.

A window 45 is located over an opening 46 formed in the top 16 of the housing 10, the window being retained in position by a sash 47 secured to the surface 16 by screws 48. Located on the front wall 11 inside the housing 10 is a suitable type of illumination such as lamp 49, the lamp 49 being vertically aligned with the window 45 and positioned in the electrical circuit with motors 21 and 38 whereby operation of switch 44 will energize or de-energize lamp 49 in consistency with the energic conditions of the motors 21 and 38.

It is to be understood that in operation of the device, when the motors 21 and 38 are in energized condition they will operate their respective blowers 20 and 37, causing them to function as has been hereinabove described. The air currents, therefore, will be made to flow in a continuous path as indicated by the arrows in Fig. 2.

To demonstrate or compare the efficiency of various types of filter media, the filter media are positioned in the path of the air current between the uprights 14 and 15 by means of a filter supporting ring 50, the ring being formed with a rearwardly extending flange portion 51 within which the filter media 52 reside and being adapted to be fitted over the ring member 31 on the inner wall 17 of the upright 14. The filter supporting ring 50 is held in position over the ring member 31 by a pair of clamp members 53 rotatably mounted on studs 54 located in the wall 17 on opposite sides of the ring member 31. The clamp members 53 have extensions 55 formed integral therewith, each of the clamp members being provided with a sloping rear or cam surface 53a and a flattened edge portion 53b parallel to the extension 55 whereby the filter supporting ring 50 may be positioned on the ring member 31 between the flattened portions and locked on said ring member by the cam surfaces when the extensions 55 are turned in an upward direction. When the extensions 55 are moved upwardly to a position substantially as shown in Fig. 4 the sloping rear or cam surface of the clamp members 53 will pressingly engage the front surface of the supporting ring 50.

As an example, to compare the efficiency of two different types of dust filter media, such as treated and untreated felt filters, each filter is cut to a semi-circular shape of a diameter consistent with the diameter of the filter supporting ring 50 inside the flange 51. The filters are then cemented together along their straight edges to form a single circular filter 52 having an untreated portion 56 and a treated portion 57. The filter 52 is then inserted in the filter supporting ring 50, after which the ring 50 is positioned on the ring member 31 in such a position that the line of division between the two filter portions is preferably located substantially along the line of sight of the viewer. The switch 44 on the front wall 11 of the housing 10 is then operated to cause illumination of lamp 49 and to energize the motors 21 and 38 causing the blowers 20 and 37 to operate to introduce an air current circulation through the apparatus as hereinbefore described, with the air current now passing through the filter 52.

At this time dust particles are introduced into the air stream, preferably colored dust such as rouge or the like. The rouge or other dust particles may be introduced into the air stream by means of an air-filled flexible bulb 58 (Figs. 1 and 5) which is removably located over the outer end of a tubular member 59 extending into an opening 60 in the housing end wall 13 which member has a collar 61 formed thereon, with screws 62 or the like being used to secure the member 59 to the interior of the wall 13 and also being used to secure an escutcheon plate 63 about the opening 60 on the outer side of the wall. The inner end of the member 59 is secured to and communicates directly with a tube 64 (Figs. 2 and 5) leading to a container 65 supported upon the base of the housing 10 and carrying a supply of rouge, colored dust or other form of dust particles. A second tube 66 leads from the container 65 to the blower 20. By manual flexing of the bulb 58, which bulb is provided with an air valve 67, air can be forced through the tube 64, container 65, and tube 66, gathering a supply of the rouge or other form of dust particles as it passes through the container 65, and from tube 66 the dust laden air will pass into the air stream through the blower 20. The air valve 67 on the bulb 58 prevents the air in the tubes 64 and 66 from escaping.

Upon entering the blower 20 the dust laden air will circulate to the filter 52 as described and upon the air stream passing through the filter 52 it will be apparent that the filter portion 56 which has poor filtering characteristics will permit dust laden air to pass therethrough practically unhindered. However, air passing through the filter portion 57 which has better filtering characteristics will deposit an amount of the dust on the filter portion 57 and the air after passing through will be substantially free of dust to a degree dependent upon the particular filtering characteristics of the portion 57. This comparison between the filter portions 56 and 57 is easily made since dust particles passing through the untreated filter portion 56 will be illuminated by the light emanating from the lamp 49. This, therefore causes the line of demarcation of dust free and dust laden air to be unmistakably visible when the air stream passes over the window 45 and through the light rays. This is clearly illustrated in Fig. 3 in which illustration dust laden air designated by the heavy stippling 67 is shown in contrast to dust free air indicated by the light stippling 68 as it passes over the window 45. The air stream will, of course, due to the suction action of the blower 37, continue on into upright 15, through and into the bag 41 through conduit 40 as described above.

Upon removing the filter 52 from the upright 14 it will be immediately apparent from observation of the filter 52 that the treated portion 57 thereof has gathered a considerable amount of dust from the air stream whereby the untreated portion 56 has permitted dust to pass therethrough. This is evidenced by the increased color to be seen on the treated portion 57 and is evidence of the improved filtering characteristics of the treated material.

After completing the above test it may be desired to further prove the advantages or disadvantages of certain of the filter media by comparing the air flow resistance characteristics thereof. For this purpose there is located on the front wall 11 of the housing 10 a transparent tubular flow meter 69 having graduations 70 marked thereon. The flow meter 69 is supported at each end by hollow brackets 71 suitably secured to the wall 11 and each having a passageway therein communicating with the bore of the tube. The upper hollow bracket communicates, by means of tubing or other suitable conduit means 72, directly with the opening 19. The lower end of the flow meter communicates through the bracket 71 with one end of a conduit or tube 73, the other end of which is connected to an air filtering device 74 suitably positioned within the housing 10. One or more openings are provided in the rear wall of the housing 10 to serve to permit entry of air into the interior of the housing whereby said air, during the test for air flow through the filtering material, may be drawn through the filtering device 74.

In accomplishing this latter test for determining the air flow resistance as well as in determining the filtering characteristics, it is first necessary to cause the motors 21 and 38 to operate through manipulation of the switch 44 to cause the blower 20 to function to draw air through the opening 19.

In performing the latter test for determining the resistance of air flow through the filtering material under test, the said filtering material is held in position over the opening 19 whereby the suction created by the blower 20 will cause air to be drawn through the filtering material. The retardation of the flow of air inwardly of the opening 19 created by the resistance of the filtering material to the flow of air therethrough will cause a partial vacuum to be created by the blower 20 whereupon air will then be drawn through the conduit means 72 which is connected to the upper end of the tubular portion of the flow meter 69 thereby causing the said air to be drawn upwardly through said tubular member and through the filter device 74 which is connected to the lower end of said tubular member by the conduit means 73. The amount of air drawn through the conduit 72 is therefore proportional to the resistance of the filtering material to the flow of air therethrough and will vary according to the variations in said resistance. The variation in the amount of air drawn through the conduit 72 as determined by the resistance of air flow through the filtering material may be determined through the provision of a pellet 75 positioned internally of the tubular portion of the flow meter 69, see Fig. 7. This pellet 75 will rise or fall within the flow meter 69 in accordance with the increase or decrease of the air passing therethrough. Therefore, a reading of the graduations 70 as indicated by the pellet 75 may be taken to indicate the resistance of the particular portion 56 or 57 of the filter 52 being tested. To compare the tested portion with the untested portion it is merely necessary to remove the tested portion from the opening 19 and to place the untested portion in this position and a reading taken of the resistance of said portion. In this way comparisons can be easily made between various types of filter media.

As an example, it may be desired to prove that a particular type of treated felt is a better dust filter than an untreated felt. Therefore, the present invention may be used to demonstrate the better dust absorbing or permeation qualities of the treated felt while also proving that although chemically treated the air resistance of the treated felt is not greater than the untreated felt as shown by readings taken from the flow meter during such tests.

It is particularly pointed out that during the initial test for determining the filtering characteristics of particular filtering media and when such media is placed in test position in the holding means 50, air may be freely drawn through the opening 19 by the blower 20. This free flow of air through the opening 19, therefore, will not cause any air to be drawn through the conduit means 72 and the air flow testing means remains inoperative. When the filtering material, however, is placed over the opening 19 as described above for test of resistance of air flow therethrough, air is thereby prevented from flowing through the opening 19 in proportion to the resistance of the filtering material to the flow of air therethrough and the blower 20 will thereupon cause air to be drawn through the conduit 72. The rate of withdrawing of air from the conduit 72 will be recorded by the flow meter, as described above. This latter test as well as the first-named test are of extreme importance in the commercial production of respirators for it is of utmost importance that the greatest amount of protection is provided by the filter media while at the same time allowing relatively free and substantially normal respiration.

With the above testing device, therefore, it is possible to definitely determine the above two factors and to ascertain from said tests which materials provide the maximum of efficiency results as to said two factors.

It will be seen that the present invention is simple and efficient for testing filtering or permeation qualities and air flow resistance of filter media without involving the use of complicated or expensive means.

Many other comparisons between various types of filter media and tests thereof can be made with this apparatus and it is not desired to limit the functions thereof to the exact functions and operations described.

It will be apparent that many changes and modifications may be made in the construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

I claim:

1. In a device of the character described, a base, a pair of spaced hollow uprights on said base, said uprights each having an opening in its inner affronting surface, clamping means for securing a filter over one of said openings, blower means communicating with said openings for causing a stream of air to flow from one of said uprights through said filter into the other of said uprights, means located adjacent the first upright for introducing visible filtratable particles and the like into said air stream, and receptacle means communicating with said second upright to gather particles and the like from said stream of air.

2. In a device of the character described, a base, a pair of spaced hollow uprights on said base, said uprights each having an opening in its inner affronting surface, clamping means for securing a filter over one of said openings, blower means communicating with said opening for causing a stream of air to flow from said upright through said filter when secured over the opening, further blower means communicating with the opening in the other upright to draw said air stream into said other upright, and means located adjacent said first upright for introducing visible filterable matter into said air stream.

3. In a device of the character described, a hollow base having an opening therein, a pair of spaced hollow uprights on said base having their interiors communicating with the interior of the base, said uprights each having an opening in its inner affronting surface, clamping means for securing a filter over the opening in one of said uprights, blower means communicating with the interior of the upright carrying the filter clamping means for causing an air stream to flow through the opening in the base into the interior of said upright, and subsequently through the filter, means located adjacent said first upright for introducing visible filterable particles and the like into the air stream, and a second blower means communicating with the interior of the other upright for drawing the air stream after its penetration of the filter through the opening in said second upright and into the interior thereof and receptacle means communicating with said second blower means for gathering particles and the like from said stream of air.

4. In a device of the character described, a hollow base having an opening therein, a pair of spaced hollow uprights on said base having their interiors communicating with the interior of the base, said uprights each having an opening in its inner affronting surface, clamping means for securing a filter over the opening in one of said uprights, blower means communicating with the upright carrying the filter for causing an air stream to flow through the opening in the base into the interior of said upright, and subsequently through the filter, a second blower means communicating with the other upright for drawing the air stream after its penetration of the filter through the opening in the second upright and into the interior thereof, means for introducing visible filterable matter into said air stream adjacent the first upright, illuminating means directed upon the air stream as it passes from the filter to the second upright for illuminating the filterable matter in said air stream, and receptacle means communicating with the second blower for gathering the unfiltered matter from the stream.

5. In a device of the character described, a hollow base having an opening therein, a pair of spaced hollow uprights on said base having their interiors communicating with the interior of the base, said uprights each having an opening in its inner affronting surface, clamping means for securing a filter over the opening in one of said uprights, blower means communicating with the upright carrying the filter for causing an air stream to flow through the opening in the base into the interior of said upright, and subsequently through the filter, a second blower means communicating with the other upright for drawing the air stream after its penetration of the filter through the opening in the second upright and into the interior thereof, means located adjacent said first upright for introducing visible filterable matter into said air stream, and illuminating means directed upon the air stream as it passes from the filter to the second upright for illuminating the filterable matter in the air stream, said illuminating means comprising an electrical source of light located within the base, and a window located in the top of the base between the uprights and so disposed that the air stream after leaving the filter will pass over the window before entering the second upright permitting the filterable matter therein to be illuminated by the light rays emanating from the electrical source, and receptacle means communicating with said second blower means for removing the unfiltered material from the air stream.

6. In a device of the character described, a hollow base having an opening therein, a pair of spaced hollow uprights on said base having their interiors communicating with the interior of the base, said uprights each having an opening in its inner affronting surface, a filter located over the opening in one of said uprights and comprising portions having different filtering characteristics, clamping means for securing the filter over said opening, blower means communicating with the upright carrying the filter for causing an air stream to flow through the opening in the base into the interior of said upright, and subsequently through the filter, a second blower means communicating with the other upright for drawing the air stream after its penetration of the filter through the opening in the second upright and into the interior thereof, means located adjacent said first upright for introducing visible filterable matter into said air stream, and illuminating means directed upon the air stream as it passes from the filter to the second upright for illuminating the filterable matter in said air stream, said illuminating means comprising an electrical source of light located within the base, and a window located in the top of the base between the uprights and so disposed that the air stream after leaving the filter will pass over the window before entering the second upright permitting the filterable matter therein to be illuminated by the light rays emanating from the electrical source, whereupon the amounts of filterable matter penetrating the different portions of the filter may be distinguished.

7. In a device of the character described, a hollow base having an opening therein, a pair of spaced hollow uprights on said base having their interiors communicating with the interior of the base, said uprights each having an opening in its inner affronting surface, a filter located over the opening in one of said uprights and comprising portions having different filtering characteristics, clamping means for securing the filter over said opening, blower means communicating with the upright carrying the filter for causing an air stream to flow through the opening in the base into the interior of said upright, and subsequently through the filter, a second blower means communicating with the other upright for drawing the air stream after its penetration of the filter through the opening in the second upright and into the interior thereof, means comprising a manually operable air bulb located externally of the base for introducing visible filterable matter into said air stream, and an illuminating device directed upon the air stream as it passes from the filter to the second upright for illuminating the filterable matter in the air stream, said illuminating device comprising an electrical source of light located within the base, and a window located in the top of the base between the uprights and so disposed that the air stream after leaving the filter will pass over the window before entering the second upright permitting the filterable matter therein to be illuminated by the light rays emanating from the electrical source, whereupon the amounts of filterable matter penetrating the different portions of the filter may be distinguished.

8. In a device of the character described, a hollow base having an opening therein, a pair of spaced hollow uprights on said base having their interiors communicating with the interior of the base, said uprights each having an opening in its inner affronting surface, a filter located over the opening in one of said uprights and comprising portions having different filtering characteristics, clamping means for securing the filter over said opening, blower means communicating with the upright carrying the filter for causing an air stream to flow through the opening in the base into the interior of said upright, and subsequently through the filter, a second blower means communicating with the other upright for drawing the air stream after its penetration of the filter through the opening in the second upright and into the interior thereof, means comprising a manually operable air bulb located externally of the base for introducing visible filterable matter into said air stream, an illuminating device directed upon the air stream as it passes from the filter to the second upright for illuminating the filterable matter in the air stream, said illuminating device comprising an electrical source of light located within the base, and a window located in the top of the base between the uprights and so disposed that the air stream after leaving the filter will pass over the window before entering the second upright permitting the filterable matter therein to be illuminated by the light rays emanating from the electrical source, whereupon the amounts of filterable matter passing through the different portions of the filter may be distinguished, and an electrical circuit connecting both of said blower means and said illuminating device for simultaneous operation.

9. In a device of the character described, a hollow base having an opening therein, a pair of spaced hollow uprights on said base having their interiors communicating with the interior of the base, said uprights each having an opening in its inner affronting surface, a filter located over the opening in one of said uprights and comprising portions having different filtering characteristics, clamping means for securing the filter over said opening, blower means communicating with the upright carrying the filter for causing an air stream to flow through the opening in the base into the interior of said upright, and subsequently through the filter, a second blower means communicating with the other upright for drawing the air stream after its penetration of the filter through the opening in the second upright and into the interior thereof, means comprising a manually operable air bulb located externally of the base for introducing visible filterable matter into said air stream, an illuminating device directed upon the air stream as it passes from the filter to the second upright for illuminating the filterable matter in the air stream, said illuminating device comprising an electrical source of light located within the base, and a window located in the top of the base between the uprights and so disposed that the air stream after leaving the filter will pass over the window before entering the second upright permitting the filterable matter therein to be illuminated by the light rays emanating from the electrical source, whereupon the amounts of filterable matter passing through the different portions of the filter may be distinguished, means comprising a container placed adjacent the second blower means for collecting the filterable matter after its passage through the second upright, and an electrical circuit connecting both of said blower means and said illuminating device for simultaneous operation.

CHARLES L. HAZELTON.

References Cited in the file of this patent

UNITED STATES PATENTS

| Number | Name | Date |
|---|---|---|
| 1,449,931 | Barr | Mar. 27, 1923 |
| 1,517,144 | Anderson | Nov. 25, 1924 |
| 1,599,964 | Haven | Sept. 14, 1926 |
| 2,072,872 | Finkelstein | Mar. 9, 1937 |
| 2,104,047 | Long | Jan. 4, 1938 |
| 2,112,304 | Rhed | Mar. 29, 1938 |
| 2,184,433 | Reed | Dec. 26, 1939 |
| 2,228,371 | Shaw | Jan. 14, 1941 |
| 2,254,259 | Aller | Sept. 2, 1941 |
| 2,346,690 | Larkins | Apr. 18, 1944 |
| 2,355,858 | Hahn et al. | Aug. 15, 1944 |
| 2,422,179 | Brewster | June 17, 1947 |
| 2,485,588 | Grant | Oct. 25, 1949 |